United States Patent [19]

Napiorkowski et al.

[11] Patent Number: 5,567,916

[45] Date of Patent: Oct. 22, 1996

[54] GROMMET

[75] Inventors: John J. Napiorkowski, Irving, Tex.;
Walter K. Butler, III, Sebago, Me.;
Mark P. Cote, Springvale, Me.;
Thomas W. Kroll, Portland, Me.

[73] Assignee: Siecor Corporation, Hickory, N.C.

[21] Appl. No.: 402,808

[22] Filed: Mar. 13, 1995

Related U.S. Application Data

[63] Continuation of Ser. No. 74,601, Jun. 11, 1993, abandoned.

[51] Int. Cl.$^6$ .......................... H01B 17/26; B65D 55/00
[52] U.S. Cl. .................... 174/153 G; 174/65 G; 16/2
[58] Field of Search ................ 174/65 G, 65 SS, 174/65 R, 152 G, 153 G; 16/2

[56] References Cited

U.S. PATENT DOCUMENTS

| | | | |
|---|---|---|---|
| 2,820,088 | 1/1958 | Sperry | 174/153 G |
| 3,003,084 | 10/1961 | Wilkinson | 174/153 GX |
| 3,244,802 | 4/1966 | Sturtevant et al. | 174/153 G |
| 3,245,428 | 4/1966 | Klimak et al. | 174/153 GX |
| 3,564,113 | 2/1971 | Kindler | 174/65 G |
| 3,873,757 | 3/1975 | Berke et al. | 174/65 R X |
| 4,516,818 | 5/1985 | Johnston et al. | 439/135 |
| 4,749,359 | 6/1988 | White | 439/133 |
| 4,824,390 | 4/1989 | Crane et al. | 439/271 |
| 4,910,770 | 3/1990 | Collins et al. | 379/399 |
| 5,101,079 | 3/1992 | Rodrigues et al. | 174/65 R |
| 5,102,347 | 4/1992 | Cote | 439/412 |
| 5,270,487 | 12/1993 | Sawamura | 174/65 GX |

FOREIGN PATENT DOCUMENTS

| | | | |
|---|---|---|---|
| 0285691 | 2/1965 | Netherlands | 174/65 G |
| 1154929 | 6/1969 | United Kingdom | 174/153 G |
| 1361945 | 7/1974 | United Kingdom | 174/65 SS |

OTHER PUBLICATIONS

GTE brochure, Protected Terminating Devices NI–2025, NI–2050, NI–2100, NI–2200, GTE Control Devices, Standish, ME, May 1992.

GTE brochure, Introducing "The Next Step In The Evolution Of Network Interface Technology", GTE Control Devices, Standish, ME, May 1992.

Keptel brochure, "SNI–5000, Tomorrow's Network Interface System Today", Keptel Inc., 1985, pp. 2 and 5.

GTE brochure, "Weatherproof, Corrosion Proof . . . and We Guarantee It", Sylvania GTE Control Devices, Dec. 1984, p. 4.

Lippincott Brochure, "GL–700 Multi–Unit Network Interface Device", Lippincott Industries, Spokane, Washington, May 1988, pp. 2 and 6.

Lippincott brochure, "GL–600 Multi–Unit Network Interface Device", Lippincott Industries, Inc., Spokane, Washington Dec. 1985, pp. 3 and 4.

GTE brochure, Protected Terminating Device NI–2006, GTE Control Devices, Standish, ME, May 1992.

GTE brochure, Protected Terminating Device PTD, GTE Control Devices, Standish, Me, May 1992.

Primary Examiner—Hyung S. Sough
Attorney, Agent, or Firm—Wesley T. Noah

[57] ABSTRACT

A grommet is provided having an outer peripheral portion and a central portion having different patterns on opposing surfaces thereof. In one embodiment the outer peripheral portion and the central portion are fabricated from different materials.

1 Claim, 6 Drawing Sheets

GROMMET

RELATED U.S. APPLICATION

This application is a continuation of Ser. No. 08/074,601 filed Jun. 11, 1993, now abandoned.

BACKGROUND OF THE INVENTION

1. Field of the Invention

The present invention relates to a grommet. The grommet of the present invention is particularly useful in a network interface device in which a plurality of wires or cables enter an enclosure.

2. Description of the Prior Art

Historically grommets useful in network interface devices have been fabricated from a homogeneous, flexible rubber-like material. Such grommets typically include a center section in the form of a single membrane through which one or more wires, cables or conduits and the like, referred to herein as "wires", enter or exit the device, and a thicker outer peripheral section which may be attached to an apertured surface of the device in the usual manner. In order to insert such wires into the device, typically the membrane is punctured or slit. For example, in some prior art grommets, the thin membrane which forms the center section is punctured to provide a hole through which the wires may be inserted or threaded directly through the grommet and into the device. In other prior art grommets, it is desirable to slit the grommet from the center of the membrane completely through the generally thicker outer peripheral section thereby permitting the wires to be dropped into the grommet in a generally radial direction as opposed to threaded through a hole in the grommet center.

In order to facilitate and direct the tearing or otherwise opening of the grommet material, it is common for the center section to be thin relative to the outer peripheral section. It is also common to provide the center section with a pre-creased pattern. When the term "pre-creased pattern" is used herein it is meant that the membrane has been provided with means to facilitate and direct the tearing or otherwise opening of the membrane in the desired pattern. For example, the membrane surface may be provided with thinner sections which coincide with a desired pattern. In another example, the membrane surface may be scored by providing lines, grooves, notches and the like which outline the desired pattern. In yet another example, the membrane may be provided with apertures or slits which define the desired pattern.

Some patterns are known to be preferable over others depending upon the application. Patterns in the form of thin circular areas are typical in applications where a single wire is to be pushed through the grommet. When a plurality of wires having varying sizes are to be inserted into the device, a star shaped pattern is desirable. It is common for the pattern to be the same on one or both surfaces of the membrane thus providing grommets for a specific end use.

Typically the center section of prior art grommets is thin in order to facilitate the puncturing, slitting or tearing thereof as described above, and also so that the membrane will be compliant. In theory, the punctured membrane acts as a sphincter around a single wire, conduit or cable passing through the membrane to provide a tight fit to prevent moisture, dust or insects from entering the enclosure. However, in many enclosures such as, for example, typical network interface devices, a plurality of wires pass through the grommet. The result is that open air spaces exist around the wires due to the inability of the grommet to conform exactly to the irregular shape which is present.

It is an object of the present invention to provide an improved grommet having a central section which will conform to one or more wires which pass through the grommet.

A further object of the present invention is to provide such a grommet wherein one or more wires may be inserted directly through the center section of the grommet.

Another object of the present invention is to provide such a grommet wherein one or more wires may be dropped into the grommet in a generally radial direction.

Yet a further object of the present invention is to provide such a grommet having a plurality of distinct patterns for varying applications.

Another object of the present invention is to provide such a grommet having a plurality of distinct patterns for varying applications, the patterns being disposed in such a manner that puncturing and tearing of the grommet is facilitated.

SUMMARY OF THE INVENTION

This invention achieves these and other results by providing a grommet having an outer peripheral section and a central section, the central section having a first surface and an opposite second surface. In one embodiment the first surface includes a first pattern and the opposite second surface includes a second pattern, the first and second patterns being different from one another. In an alternative embodiment, the grommet comprises an outer portion composed of a first material and a central portion composed of a second material, the first and second materials being different from one another.

BRIEF DESCRIPTION OF THE DRAWINGS

The invention may be clearly understood by reference to the attached drawings in which.

DESCRIPTION OF THE PREFERRED EMBODIMENT

Figure 1:
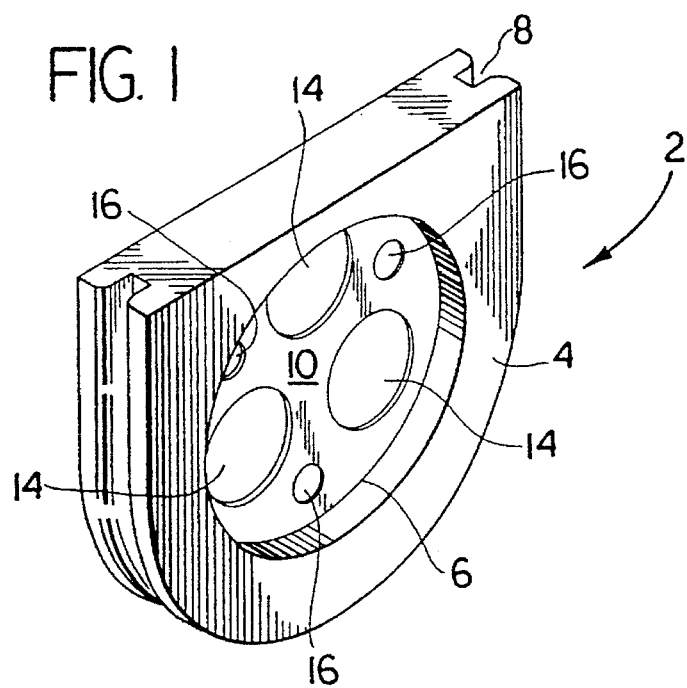
FIG. 1 is a perspective view taken from one side of the present invention.
Figure 2:
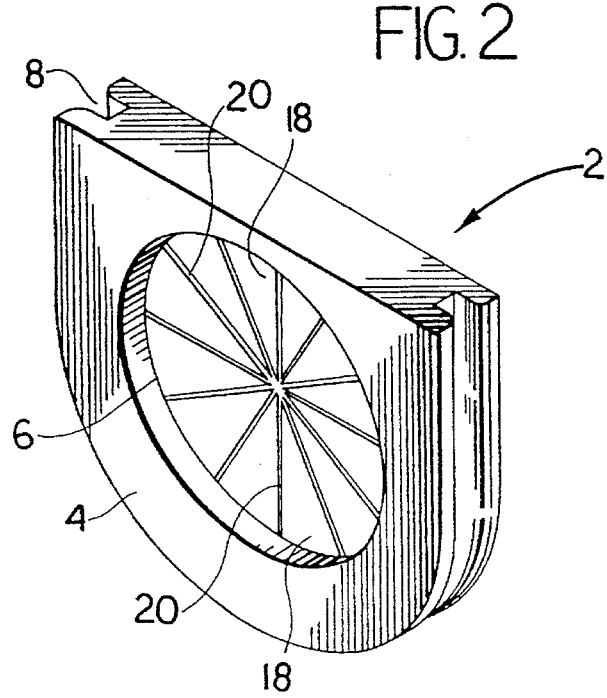
FIG. 2 is a perspective view taken from the opposite side of the embodiment depicted in FIG. 1.
Figure 3:
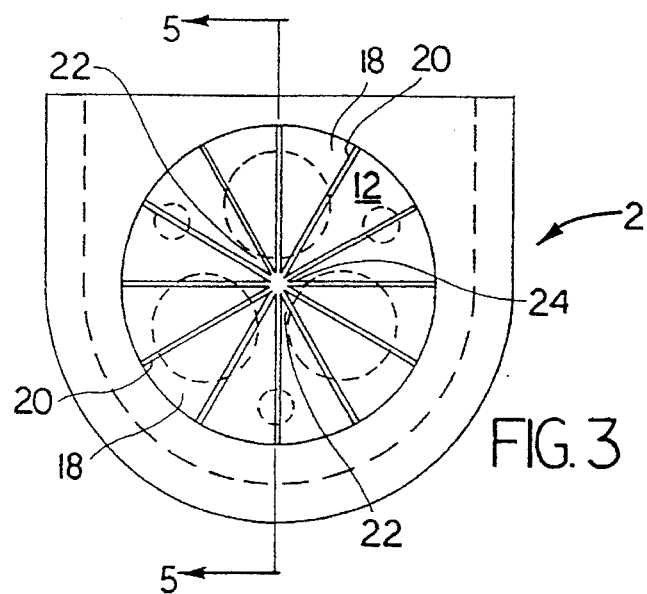
FIG. 3 is a plan view of the side of the present invention depicted in FIG. 2.
Figure 5:
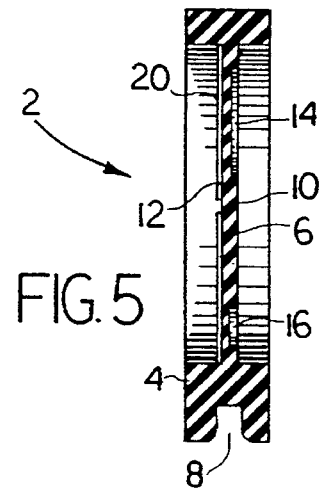
FIG. 5 is a view in cross section taken along lines 5—5 in FIG. 3.

The embodiment of this invention which is illustrated in FIGS. 1 to 5 is particularly suited for achieving the objects of this invention. FIGS. 1 to 5 depict a grommet 2 comprising an outer peripheral section 4 and a central section 6. Outer peripheral section 4 includes a groove 8 for attaching the grommet to an apertured surface (not shown) in the usual manner. Grommet 2 may be formed from any known flexible grommet material such as the homogenous, flexible rubber-like material presently used in the art. The outer peripheral section 4 is thicker than the central section 6, the latter being in the form of a membrane. In the present invention, the membrane has a first surface and an opposite second surface each of which comprises a pattern, the pattern of the first surface differing from the pattern of the second surface. The membrane depicted in FIGS. 1 to 5 has a first surface 10 and an opposite second surface 12, the surface 10 being pre-creased in a first pattern and the surface 12 being pre-creased in a second pattern which is different from the first pattern. Any pattern may be selected so long as the pattern on one membrane surface is different from the pattern on the opposite membrane surface. For example, one pattern may comprise at least one circle and the opposite pattern may comprise a star-like pattern wherein a plurality of wedges is provided each having radial edges. One pattern selection believed to be of particular usefulness is depicted in FIGS. 1 to 5. In this embodiment surface 10 of the central membrane has a circle pattern which comprises a plurality of circles 14 and 16, and surface 12 of the central membrane has a star-like pattern in the form of a plurality of wedges 18 each having edges 20 which extend radially from an apex 22 adjacent the center 24 of surface 12. The circle pattern and the star-like pattern are each in the form of a pre-creased pattern. An example of the pre-creased aspect of the membrane of central section 6 is best depicted in FIG. 5. In particular, thinner sections of the membrane are provided to facilitate and direct the tearing of the membrane when it is punctured for insertion of one or more wires or other elongated members. In the embodiment of FIGS. 1 to 5, the membrane is thinner along each radial edge 20. The membrane is also thinner at the area enclosed by each circle 14 and 16.

Figure 4:
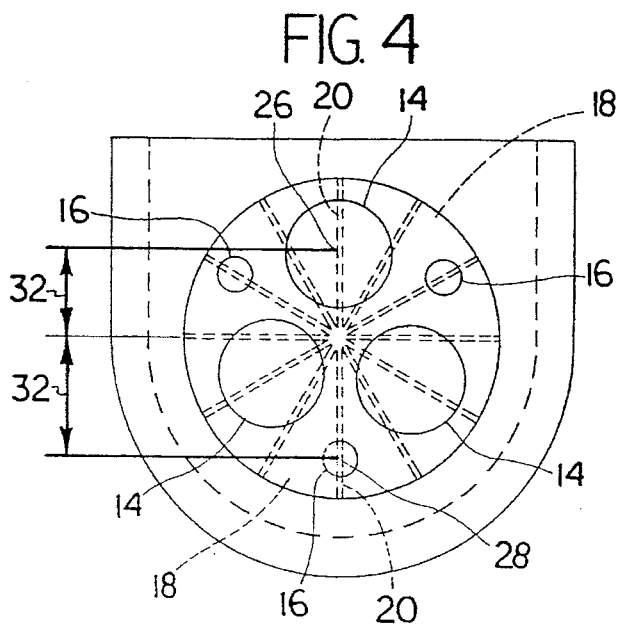
FIG. 4 is a plan view of the side of the embodiment depicted in FIG. 1.

In the preferred embodiment, the position of the pattern on surface 10 relative to the position of the pattern on surface 12 is important. For example, aligning the thin sections of the star pattern with the center of the thin circular areas of the circle pattern serves to facilitate the puncture or tearing of the membrane, the membrane being thinnest where the two patterns overlap. For example, FIG. 4 depicts a circle 14 on surface 10 having a center 26 which coincides with a radial edge 20 of a wedge 18 on the opposite surface 12, and a circle 16 on surface 10 having a center 28 which coincides with another radial edge 20 of a wedge 18 on surface 12. The remaining circles 14 and 16 also have centers which coincide with a radial edge as depicted in FIG. 4.

As depicted in FIG. 4, circles 14 preferably provide a plurality of first circles which are equally spaced circumferentially relative to the center 30 of surface 10, the center of each circle being spaced a first distance 32 from center 30. Similarly, circles 16 preferably provide a plurality of second circles 16 equally spaced circumferentially relative to center 30, the center of each circle 16 being spaced a second distance 34 from center 30. In the preferred embodiment the distance 34 is greater than the distance 32. Although not necessary, as depicted in FIG. 4 there are three circles 14 and three circles 16, the diameter of circles 14 being greater than the diameter of circles 16.

Figure 6:
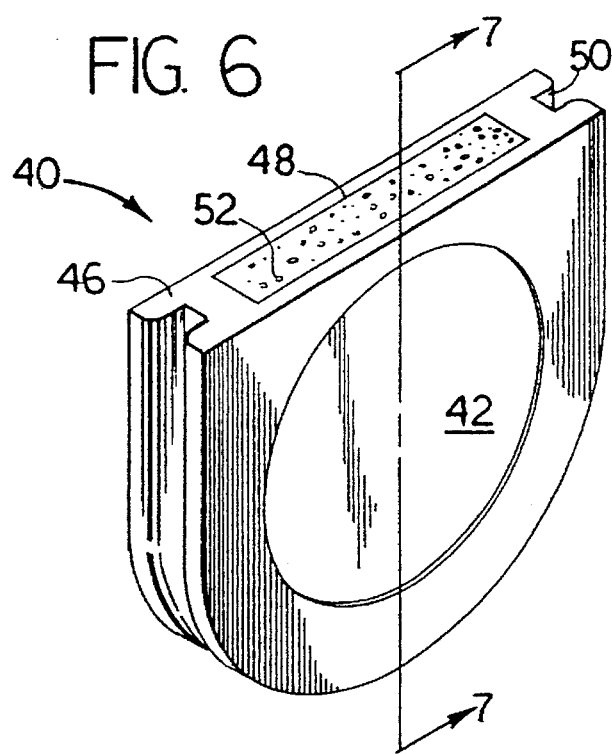
FIG. 6 is a perspective view of an alternative embodiment of the present invention.
Figure 7:
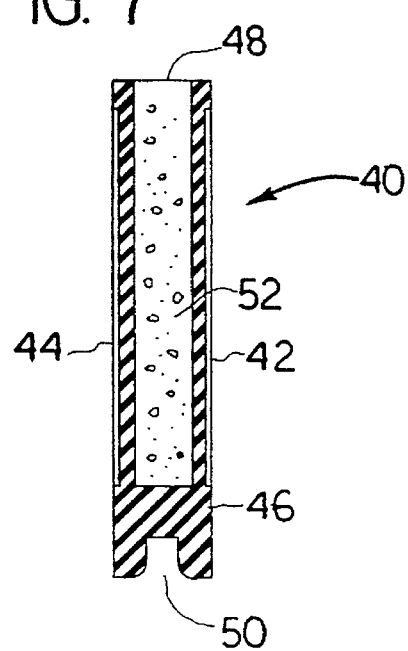
FIG. 7 is a view in cross section taken along lines 7—7 in FIG. 6.

In an alternative embodiment, the grommet of the present invention comprises first means in the form of an outer portion which may be attached to an apertured surface in the usual manner and second means in the form of a central portion through which one or more wire, cable, conduit, or other elongated member, may be inserted, the first means being composed of a first material and the second means being composed of a different second material. For example, in the embodiment of FIGS. 6 and 7, a grommet 40 is depicted having an outer portion which comprises a first outer surface 42 and an opposite second outer surface 44. Surface 42 is spaced from and joined to surface 44 by a peripheral segment 46 to form an open air space 48 between the two surfaces. In the preferred embodiment, surfaces 42 and 44 are in the form of a membrane which is thinner relative to the thicker peripheral segment 46. The peripheral segment 46 is provided with a groove 50 for attaching the grommet to an apertured surface in the usual manner. Grommet 40 may be formed from any known flexible grommet material such as the homogenous, thermoplastic elastomer material presently used in the art. Grommet 40 also includes a central portion which comprises a sealing material 52 which is disposed within the open air space 48 and is retained therein by the membrane surfaces 42 and 44. Sealing material 52 provides a material which is softer than the thermoplastic elastomer material of the outer portion of the grommet. Although not necessary, in the preferred embodiment the sealing material is an environmental gel such as described in U.S. Pat. No. 5,102,347 to Cote. If desired, one or both of the membrane surfaces 42 and 44 may have a pre-creased pattern to facilitate and direct the ripping or tearing which takes place during wire insertion. For example, if desired the membrane surfaces 42 and 44 each may have a pre-creased pattern as described with respect to the preferred embodiment of FIGS. 1 to 5. In use, one or more wires are inserted through the membrane surfaces 42 and 44, the gel 52 within open air space 48 flowing completely around the wires to effect the desired seal. It will be readily understood by those skilled in the art that if desired grommet 40 may be provided having a plurality of open air spaces filled with sealing material and bound by thin membranes.

Figure 8:
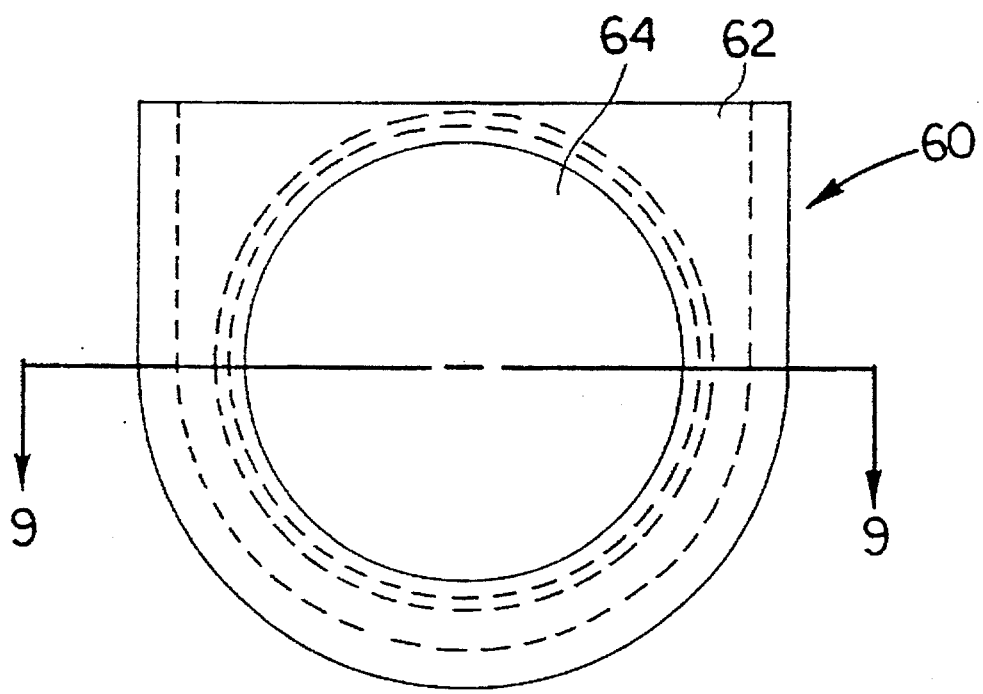
FIG. 8 is a plan view of another embodiment of the present invention.
Figure 9:
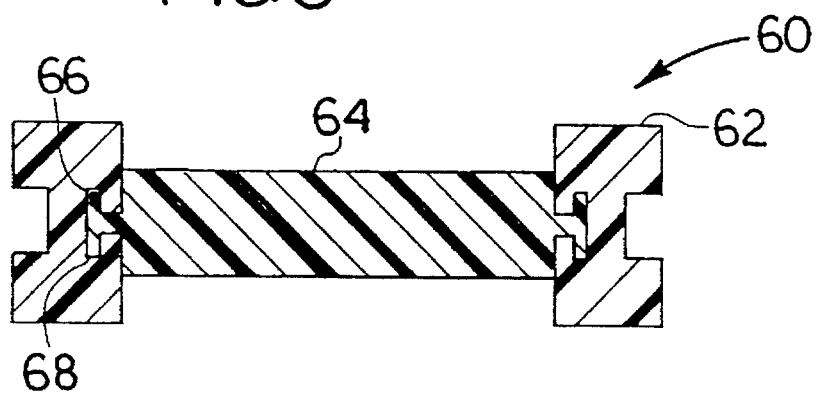
FIG. 9 is a view in cross section taken along lines 9—9 in FIG. 8.

In the alternative embodiment depicted in FIGS. 8 and 9 a grommet 60 is provided having an outer grooved portion which comprises a first configuration 62 and a central portion which comprises a second configuration 64. Configuration 62 mates with configuration 64 to attach the outer portion of the grommet to the inner portion. In the preferred embodiment, configurations 62 and 64 may be thermally bonded or otherwise joined by commingling of cavities. For example, such mating may be provided by fabricating the grommet in a typical dual durometer molding process using a rigid material to form configuration 62 and a less rigid material to form configuration 64. If desired such mating may be provided by a male segment 66 and female segment 68 of a typical T-shaped connection as depicted in FIG. 9. The outer portion may be a rigid or semi-rigid material such as any of a variety of thermoplastic and thermoset resins and the central portion may be a soft and flexible gummy material such as a thermoplastic elastomer.

Figure 10:
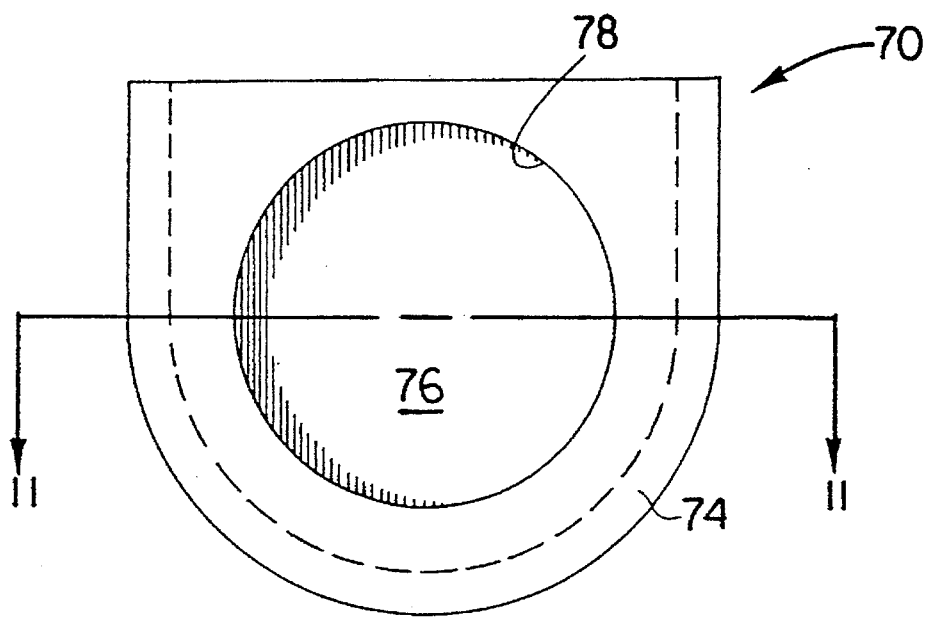
FIG. 10 is a plan view of yet another embodiment of the present invention.
Figure 11:
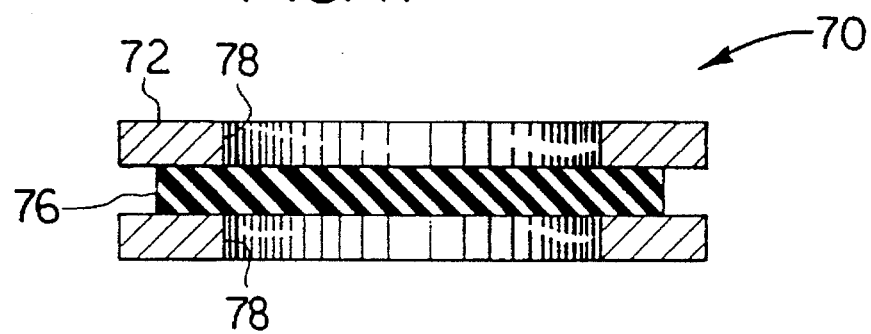
FIG. 11 is a view in cross section taken along lines 11 in FIG. 10.

In the alternative embodiment depicted in FIGS. 10 and 11, a grommet 70 is provided wherein its outer grooved portion comprises a first outer member 72 and an opposite second outer member 74, and its central portion comprises a central member 76 sandwiched between and affixed to members 72 and 74 in any known manner. Members 72 and 74 each have at least one open area therethrough adjacent the central member 76. For example, in the embodiment of FIGS. 10 and 11, members 72 and 74 are each apertured at 78, each aperture 78 being adjacent central member 76. In the preferred embodiment, each member 72 and 74 is fabricated from a rigid material such as thermoplastic and thermoset resins or a variety of sheet materials including any of a variety of metals, and central member 76 is fabricated from a flexible material such as foam rubber, rubber sheet or any of a variety of thermoplastic elastomers.

Figure 12:
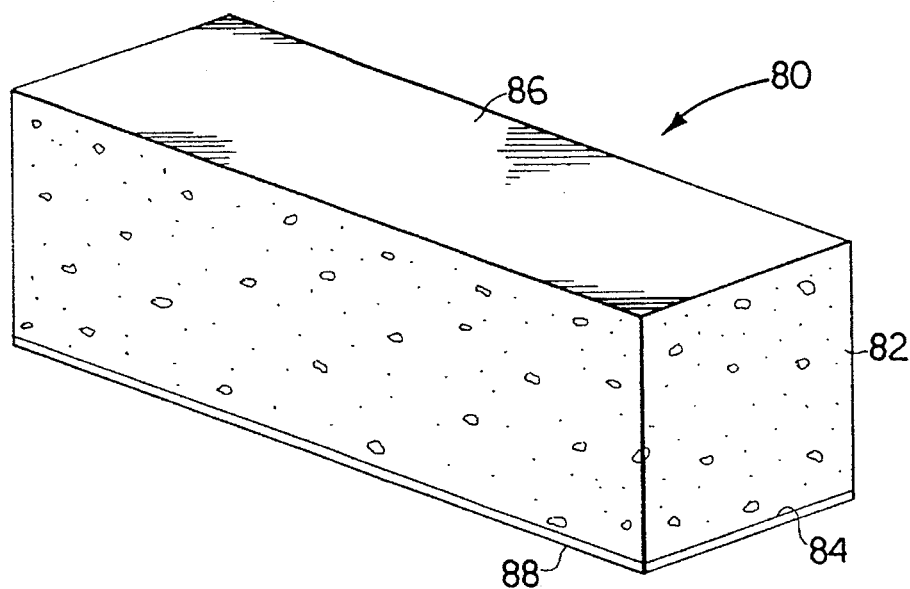
FIG. 12 is a perspective view of another embodiment of the present invention.
Figure 13:
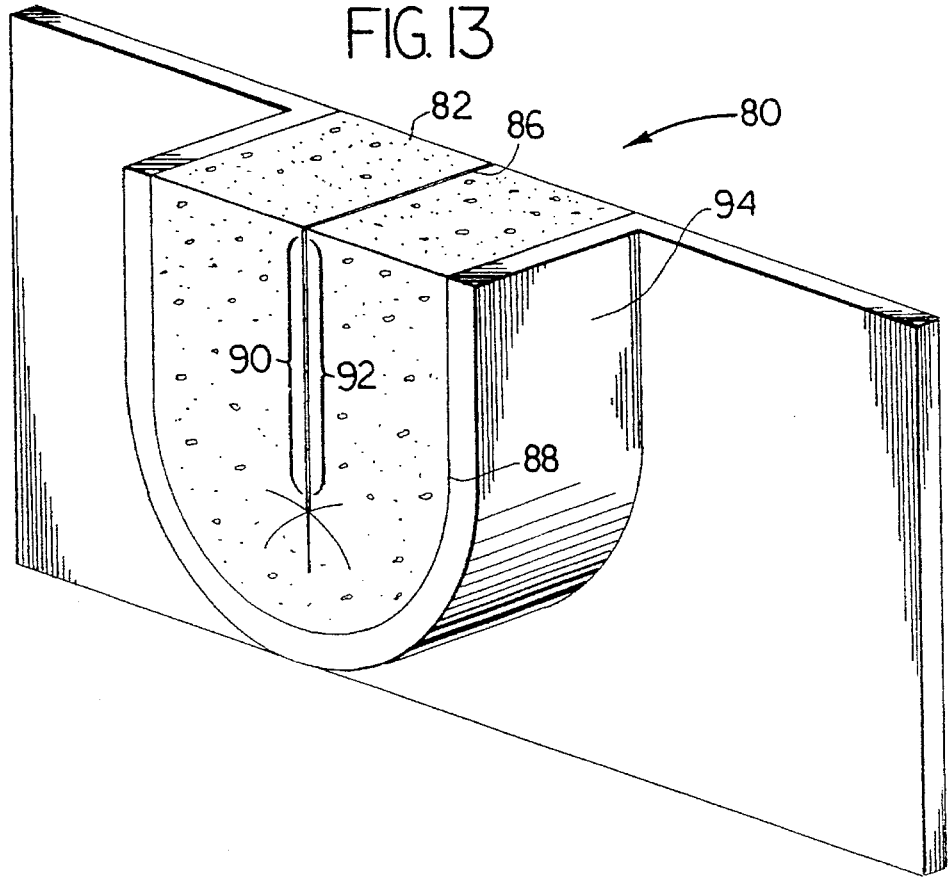
FIG. 13 is a perspective view of the embodiment of FIG. 12 installed in a network interface device.

In the alternative embodiment depicted in FIGS. 12 and 13, a grommet 80 is provided having a central portion which comprises a flexible foam material 82 having a first surface 84 and an opposite second surface 86, and its outer portion comprises an adhesive backing 88 affixed to surface 84. The adhesive backing 88 may be provided by applying, for example, pressure sensitive adhesive to surface 84. As depicted in FIG. 13, in use the central portion of the grommet 80 may be bent upon itself into a U-shape, substantially one half of surface 86 (designated 90 in FIG. 13) engaging substantially an opposite half of surface 86 (designated 92 in FIG. 13). The embodiment of FIGS. 12 and 13 is particularly useful in applications in which it is desirable to drop wires into the grommet as opposed to inserting them through the grommet. However, it will be understood by those skilled in the art that any of the embodiments of the present invention may be adapted such that the wires may be dropped into the grommet rather than inserted through one or more apertures in the central portion or section of the grommet. In use, the grommet 80 of FIG. 13 is adhered to a curved surface 94 of a network interface device such that the foam bends approximately 180° such that the non-adhesive surface 86 touches itself as depicted in FIG. 13. The adhesive backing 88 serves to provide rigidity to the outer periphery of the grommet 80 while the foam material 82 provides a compliant material which will surround any wires which pass through the grommet, including any wires having irregular shapes. In the preferred embodiment the flexible foam 82 is a closed cell foam which has the ability to prevent penetration of water through absorption.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

We claim:

1. A grommet comprising an outer peripheral section and a central section, said central section comprising a first surface having a first pattern comprising a plurality of circles oriented around the center of the central section, said central section comprising a second surface opposite the first surface and having a second pattern comprising a plurality of scored lines extending radially out from the center of the central section in a star pattern, wherein each of the plurality of the circles having one of said score lines crossing the center of the circles on the first surface such that the thickness of the central section is least where one of the scored lines is opposite one of the plurality of the circles.

* * * * *